April 4, 1950 | DE WITT R. GODDARD | 2,502,647

SIGNALING SYSTEM

Filed May 18, 1945 | 2 Sheets-Sheet 1

INVENTOR.
De Witt R. Goddard
BY
H. S. Grover
ATTORNEY

April 4, 1950 DE WITT R. GODDARD 2,502,647

SIGNALING SYSTEM

Filed May 18, 1945 2 Sheets-Sheet 2

INVENTOR.
De Witt R. Goddard
BY
H. G. Grover
ATTORNEY.

Patented Apr. 4, 1950

2,502,647

UNITED STATES PATENT OFFICE 2,502,647

SIGNALING SYSTEM

De Witt R. Goddard, Riverhead, N. Y., assignor to Radio Corporation of America, a corporation of Delaware Application May 18, 1945, Serial No. 594,400

6 Claims. (Cl. 332—27)

This application concerns a new and improved signal sending and signal receiving system. In particular, it concerns a high frequency transmitter and a high frequency transmitter and receiver.

There are many uses for small portable transmitters, small portable receivers, and small portable transceivers. For example, there is great need of such systems for war purposes, as for example, transmission between military units and between a plane and a military unit or an individual. To meet the needs of this use the equipment must be small and compact and light, and yet must be efficient, reliable and easy to operate.

It has been customary to use rather complex modulation systems to achieve modulation of a high frequency carrier. This is so whether the carrier is to be frequency or phase modulated or modulated in amplitude. If a complex modulator were used in my system the object of my invention as outlined briefly hereinbefore could not be attained.

A second object of my invention is a simple and efficient yet effective and foolproof modulator.

To attain these objects I provide as a transmitter an oscillator of the Hartley type wherein the oscillation circuits are composed primarily of inductive reactance with a small fixed capacity. The capacitance of the circuit is kept small and the inductance of the circuit is made as large as possible so that at the frequency involved the capacitive reactance of the circuit is at a minimum. The capacity in the circuit is composed primarily of the capacity between the electrodes of the tube, and this capacity varies with electrode potential variation. Since the total tank circuit capacity is kept small, the variable tube input capacity represents a relatively large proportion of the total capacitance of the tuned circuit, and slight changes in the oscillator tube bias result in appreciable frequency changes yet negligible amplitude changes in the radio frequency being generated. I make use of this capacity for frequency modulation purposes by varying the capacity between the tube electrodes in accordance with signals.

The basic concept used in my modulated generator is to make the total capacity of the generator as small as possible and vary the tube electrode capacitance, i. e., the variable capacity, to vary the frequency of the oscillations generated.

It must be noted that in prior art systems using grid modulation the capacity of the tank circuit has been made as large as possible, to enhance stability and to insure pure amplitude modulation. This is accomplished because when the variable portion, that is, the capacity between the grid and cathode and grid and anode is made as small as possible, and a very small part of the total capacity, variations in the said electrode capacity will not materially modulate the frequency of the oscillations generated. In my system I modulate the frequency of the oscillations generated in the manner described above, and this modulation is reasonably linear, particularly if the ratio of the carrier frequency to the modulation frequency is high.

In an embodiment the oscillation generating circuits include a coil in the tuned circuit in the transmitter, and the transmitter circuits are used also as part of a receiving system of the superregenerative type. When so used the oscillator tube includes additional electrodes by means of which quenching oscillations are developed. Since these oscillations are superimposed upon the direct current plate potential to the high frequency oscillator and it is desired, for proper superregeneration action, to have the total peak plate voltage just sufficient to produce oscillation during a short portion of the peak positive swings of the quench oscillations, it is necessary to reduce the direct current potential applied to the high frequency oscillator plate. This reduction in oscillator anode direct current potential causes reduction of the frequency to which the generator is tuned when receiving signals. Retuning of the oscillator circuit is necessary if the communications are to occupy a single channel in the ether.

An object of my invention is to provide automatic means whereby the oscillator tuning frequency is increased a variable amount (such as to compensate for the reduced oscillator plate voltage) when the push-to-talk switch is in the signal receiving position. This is accomplished, as will be described more in detail hereinafter, by a closed conductor variably and adjustably coupled to the inductance of the oscillator circuit. The closed loop is moved away from the inductance by the push-to-talk button to let the oscillator operate at its resonant frequency when transmitting and permitted to move into the field of the inductance an adjustable amount when the said push-to-talk control is in the "Receive" position to raise the resonant frequency of the generator circuit enough to compensate for said reduced plate voltage. The control here is as disclosed in my U. S. application Serial No. 620,347, filed October 4, 1945.

In an embodiment of the oscillator for use where the transmitter can take up a little more space and weigh a little more, the generator circuits include lines with the tube structure enclosed within the chassis formed by the support for the lines. In this embodiment the principle of operation and of frequency modulation is as described hereinabove.

Other objects of my invention and advantages gained by attaining such objects will appear from the detailed description which follows. In this description reference will be made to the attached drawings, wherein Fig. 1 illustrates a modulated oscillation generator arranged in accordance with my invention. Fig. 1*a* illustrates tuning and control circuits for the oscillator of Fig. 1 when the same is used in a transceiver as illustrated in Fig. 2.

Fig. 2 illustrates a transceiver including the generator of Fig. 1; while

Figure 1:
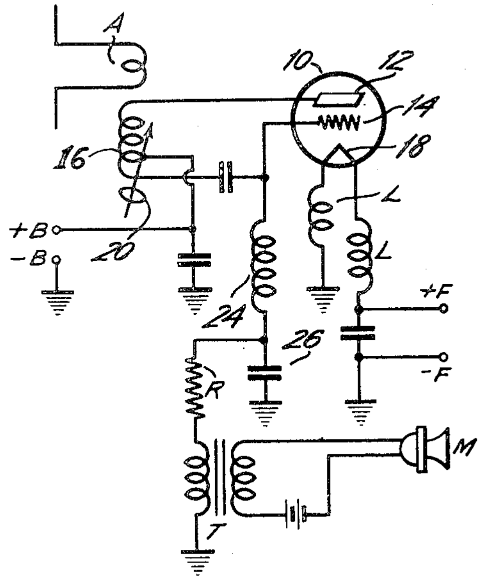

In Fig. 1, 10 is an electron discharge device having its anode 12 and grid 14 coupled differentially, with respect to the high frequency oscillatory energy, to an inductance 16. A point on the inductance 16 is connected to ground by a coupling and blocking condenser and thence to the cathode 18 of the tube 10 to complete the oscillation circuit. The point on inductance 16 is also connected to the positive terminal of a direct current potential supply source, the negative terminal of which is grounded. The grid lead to the inductance 16 includes a direct current blocking condenser. In order to operate the cathode 18 at the same radio frequency potential that appears at the tap on inductance 16, the cathode return direct current leads include tuning inductances L which tune socket connections etc. to the frequency of operation of the generator.

A ring or closed conductor 20 is mounted for movement relative to the electrical field of the inductance 16 for tuning purposes. This tuning arrangement will be described in detail hereinafter.

The oscillation generating circuit has no fixed capacity except that within the tube between the grid and anode and grid and cathode and what little capacity there is in the circuit connections. By keeping the fixed capacity of the circuit small I find that when the potential on the grid 14 is changed, the grid to cathode and grid to plate capacity in the tube is changed, thereby changing materially the frequency of operation of the system. The grid direct current biasing circuit includes the radio frequency choking coil 24, the biasing resistance R, and the secondary winding of a transformer T. The grid high frequency alternating current circuit includes the coupling condenser connecting the grid to inductance 16, part of inductance 16, ground, inductances L and cathode 18. Inductance 24 blocks the radio frequency from the modulation circuits and any radio frequency voltages which get by the choke are shunted to ground by condenser 26. The modulation frequency circuit includes ground, the secondary winding of transformer T, resistance R, choke 24 and grid 14. The tube 10 runs with very little bias, as the external grid circuit is of low impedance. The alternating voltages induced in the modulation circuit from the microphone M current excursions produce slight variations in bias on the grid 14, thereby resulting in frequency modulation of the oscillations generated. The modulated oscillations may be induced into the antenna system A for transmission.

Figure 2:
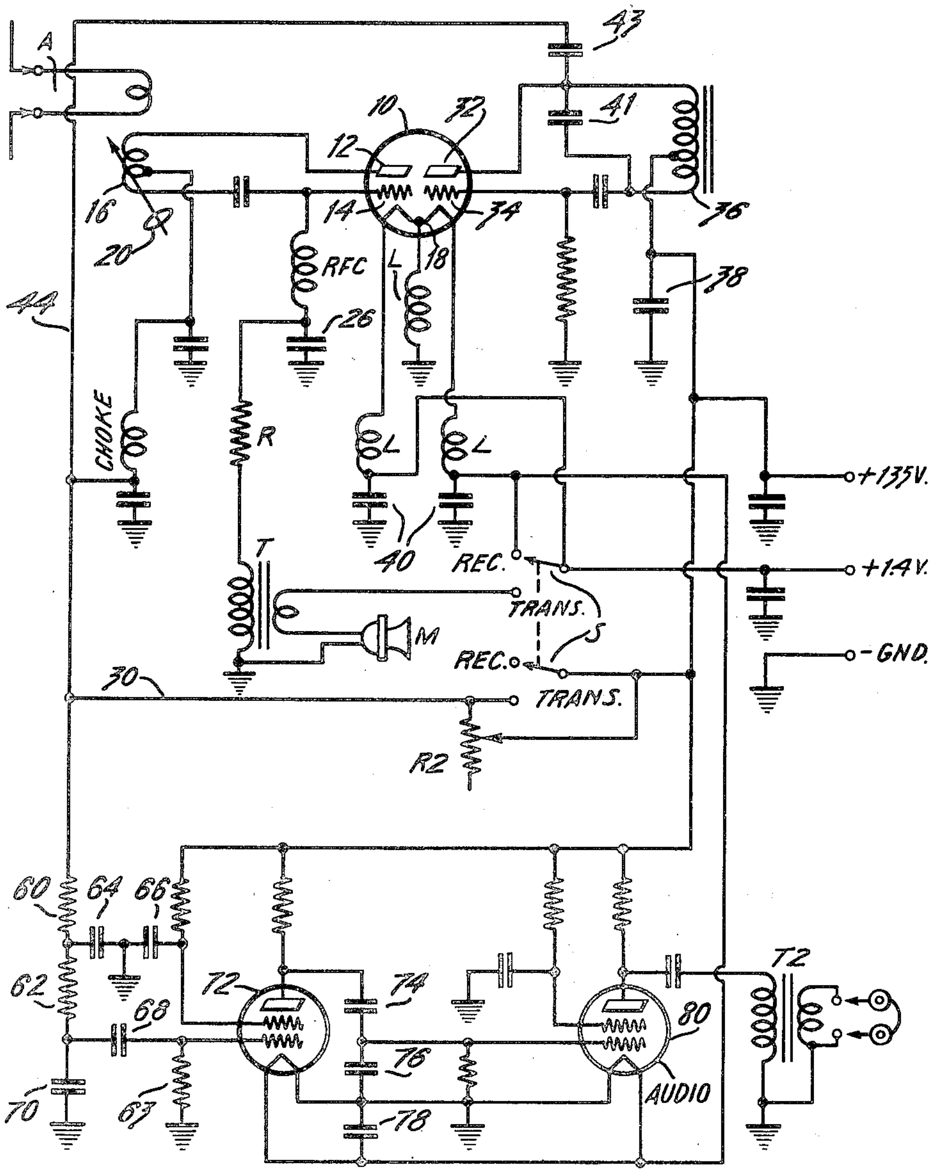

In the receiver of Fig. 2, the tube 10 has electrodes 12, 14 and 18 coupled in an oscillation generating circuit of the Hartley type as described above.

When the double pole switch S is in the position marked "Trans." the system is to be used as a transmitter and the anode 12 of tube 10 is coupled by inductance 16 and the choke coil labeled "Choke" and lead 30 and one pole of switch S to the plus terminal of a direct current source the negative terminal of which is grounded. The system then operates as described hereinbefore to generate and transmit signals. The switch S in practice may be the push-to-talk switch which the operator uses to convert the system for transmission or for reception.

The tube 10 in the transceiver of Fig. 2 has another set of elements including the cathode 18 and anode 32 and a control grid 34. The anode 32 and control grid 34 are coupled in a second oscillation generating circuit of the Hartley type and including inductance 36 which may be of the iron core type connected at its terminals to the control grid 34 and anode 32 with a point on the inductance 36 connected to ground through a condenser 38 of a size sufficient to bypass oscillations of the frequency determined by the circuit including 36. The cathode 18 is connected to ground through tuning inductances L and direct current blocking condensers 40 sufficiently large to pass freely oscillations of the generated frequency. The inductance 36 is shunted by a tuning condenser 41. In an embodiment used successfully the high frequency generator operated at several hundred megacycles per second, while the low frequency oscillator including the tank circuit 41 and 36 operated at about 150 kilocycles providing at that frequency oscillations of a proper amplitude to feed through the coupling condenser 43 and lead 44 to the tank circuit of the high frequency oscillator circuit. These oscillations are used as the quenching frequency of a super-regenerative receiver the operation of which is known in the art.

When the system is to be used as a receiver the switch S is placed in the position marked "Rec.," thereby completing a circuit through the other half of the filament 18, and placing the variable potentiometer resistance R2 in series with the direct current positive potential supply lead to the anode 12 of the high frequency oscillator.

When the system is operating as a transmitter the circuit 16 and the capacity between the electrodes and the tube causes the circuit to operate at a given frequency in the presence of a given direct current anode potential. This anode potential is made as high as permissible for good operation. When the system is to be used to receive, the direct current potential applied to the anode 12 has superimposed thereon the alternating voltages produced in the quenching oscillator including inductance 36. Now the average anode potential is increased materially and the conditions for super-regeneration are not met. To circumvent this the resistance R2 is included in the supply lead to the plate 12 when the switch is in the receiving position. This resistance R2 is adjusted so that the average potential on the anode 12 when the system is used to receive is much lower than the constant direct current potential on the anode 12 when the system is used as a transmitter.

In the receiving position, the circuit including inductance 16 is detuned with respect to the frequency of the received wave sufficiently to cause the super-regenerative detector system to operate at the side of its resonant characteristic. In this manner, the super-regenerative receiver demodulates the frequency modulations put on the carrier at the transmitter end of the system. The modulations appear on the lead 44 and are fed from the lead 44 over a low pass filter network including resistances 60, 62 and 63, and condensers 64, 66, 68 and 70. This low pass filter network filters out the 150 kc. per second quenching frequency oscillations generated in the tube 10 and supplies substantially only the potentials representing modulation to the grid of an amplifier tube 72. Some of the 150 kc. per second voltages appear on the anode of the tube 72 and these are bypassed or shunted so that they do not reach sufficient amplitude to overload the amplifier stage tube 80. A bypass condenser 76 is connected between the cathode and grid to further reduce this superaudible frequency.

The modulations substantially free of high frequency variations are amplified in the tube 80 and impressed on the primary winding of a transformer T2 the secondary winding of which may be coupled to an indicator such as headphones. The direct current circuits for the amplifier tubes are clear from the drawings, it is believed. It is noted that the filaments of the tubes 72 and 80 and the filament 18 in one side of tube 10 are disconnected when the system is used to transmit, thereby reducing the drain on the power supply source. When transmitting, a positive terminal of the direct current supply source is connected to the microphone M. This positive source is connected to the filaments of tubes 72 and 80 and to the half of the filament of tube 10 in the receive position.

As stated above, the system is to be used to transmit and receive, and, as stated above, when the switch is in the receiving position the direct current potential on the anode of the high frequency generator part of the tube 10 is reduced. This will reduce the frequency to which the circuit is tuned so that it might not respond properly to an incoming modulated wave of the frequency to which the system is tuned when the switch is in a transmitting position. I have provided an improved means for adjusting the tuning of the tank circuit including inductance 16 when the same is conditioned for receiving. This means takes the form of a closed loop 20 such as a single turn of conductive material mounted to be moved in and out of the field of the inductance 16 when the push-to-talk switch, which may also be the switch S, is manipulated. This operation is illustrated schematically in Fig. 1*a*. Ring 20 is carried on a pivoted member and biased by spring 21 toward the inductance 16. An adjustable stop 21'' sets the minimum distance between ring 20 and inductance 16.

When the ring 20 is in the field of inductance 16 it increases the frequency to which the circuit is tuned, because the effect is similar to shorting one or more turns of the inductance 16 or removing turns therefrom. When the switch S is in the "Rec." position means is provided to put the ring 20 into the field of inductance 16 sufficiently to tune the circuits to a frequency such that the frequency of the received wave falls on the slope of the resonance curve of the circuit. In an embodiment which operated very satisfactorily the ring 20 is mounted on a spring biased support so that the spring 21 tends to move the ring 20 into the field of the inductance 16 an amount which is adjustable for tuning purposes. Thus when the switch S is in the receiving position the ring 20 is moved into the field of the inductance 16 to increase the frequency to which the high frequency generating circuits including tube 10 are tuned an amount sufficient to compensate for the tendency of the oscillation generator to operate at a lower frequency because of the reduced plate potential on the anode 12. The maximum coupling position is set by adjustable stop 21''. This stop 21'' may take the form of a tuning knob or control. The position of the ring 20 is controlled by a push-to-talk button PT which also sets in motion the necessary switching operations. The contacts and switching means are also schematically shown here and may be arranged in various manners to accomplish the purpose specified. The reference characters used in Fig. 1 on the switch and associated connections are used in Fig. 1*a*. When the push-to-talk button PT is pushed the heating circuit for the filament of the tube 10 in the receiver circuit is broken. The circuit between the source of direct current and the mike is completed. The resistance R2 is shorted and as described above, tuner element 20 is moved out of the field of inductance 16.

The ring 20 is mounted for adjustment so that the mechanism which throws the ring into the field of 16 can reduce the distance between 20 and 16 only an amount sufficient to give the tuning effect desired. When the push-to-talk button is pressed, i. e., when it is desired to transmit, the mechanism is such as to throw the ring 20 out of the field of the inductance 16 completely, no matter what the adjustment of the mechanism is with respect to the receiving position of the push-to-talk switch. A preferred means for accomplishing this function and the necessary switching operation has been shown in my U. S. application Serial #620,347, filed October 4, 1945.

Figure 3:
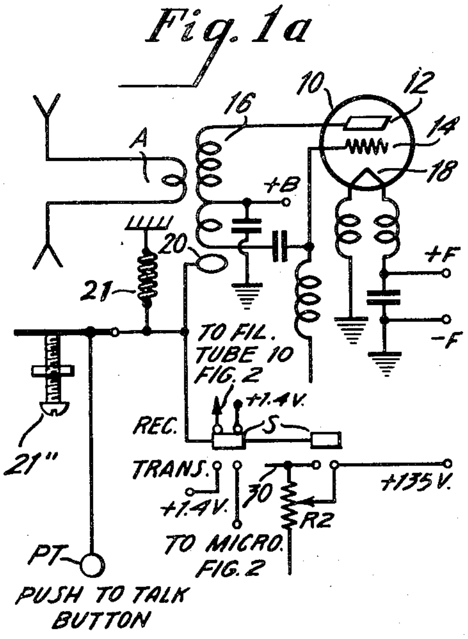
Fig. 3 illustrates a further embodiment of my improved modulated generator.
Figure 3:
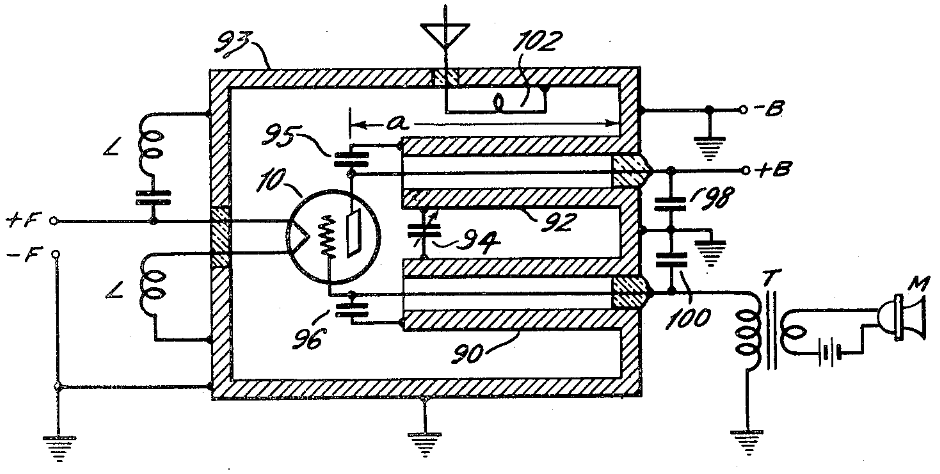

When a little more room and weight is permissible in the transmitter portion of the system, for example, in an application which operated very satisfactorily and in which the transmitter was mounted in a plane for use to a station on the ground, a system as illustrated in Fig. 3 is used. In Fig. 3 I again have shown a Hartley oscillator of the type illustrated in Fig. 1. The oscillator of Fig. 3, however, is of the stub type, with a grid stub 90 and a plate stub 92, each of which stub is of a length *a* which is a fraction of $\lambda/4$. The grid and plate stubs are located within a metallic box enclosing a triode tube 10 the circuits of which are substantially similar to those described above. Here again the only capacity in the circuit is the tube electrode and connections to ground capacity plus the distributed capacity of the resonant circuit formed by the plate and grid stubs. The effective electrical length of the stubs is adjusted in length to produce oscillations slightly higher in frequency than desired. A small variable condenser 94 is connected between the high voltage ends of the stubs. By means of this condenser the frequency of operation is readily and quickly brought down to the desired value. (This condenser is not essential, only a convenience.) The anode and the grid are each in a direct current circuit as shown, and are each in a high frequency circuit including R. F. coupling condensers 95 and 96 respectively. The condensers 95 and 96 also act as direct current blocking condensers. The condensers 98 and 100 are bypassing condensers connecting the high frequency leads to ground and are for the purpose of removing entirely any high frequency remaining on the leads from the secondary winding of transformer T and from the plate supply source. In many cases these condensers 98 and 100 are not needed.

The tube filament leads are again tuned as described hereinbefore by inductances L. In some cases these tuning inductances may be omitted, this depending upon the parameters of the circuit. The grid of the oscillator is connected through the secondary winding of transformer T to ground, the primary winding of said transformer being connected with a microphone M. The physical dimension of the metallic closure member 93 does not tune the system except for its added distributed capacity. The frequency of operation depends entirely on the electrical length of the stubs 92 and 90, and as is known, the same provide, with the tube capacity and distributed capacity, a tank circuit electrically as shown in Fig. 1. As in Fig. 1, in operation the tube 10 runs with very little bias, because the external grid circuit is of low impedance. The alternating current voltages induced in this circuit from the microphone current excursions produce slight variations in grid bias, resulting in a frequency modulation that follows the microphone current. As these bias changes are small the amplitude modulation produced is likewise small. A transmitting antenna is coupled to the plate stub by a loop 102.

What is claimed is:

1. In a frequency modulation system, a tube having electrodes including an anode, a control grid and a cathode, an inductance coupled between the control grid and anode, a point on said inductance being coupled to the cathode to include the said electrodes in a regenerative circuit for generating oscillations, the inductance being as large as possible so that the same with solely the tube interelectrode capacity and connections forms a circuit resonant at the desired operating frequency, and means for modulating the direct potential on the grid of the tube to vary directly the tube interelectrode capacity to correspondingly modulate the frequency of the oscillations generated through the direct effect of the varying tube interelectrode capacity on said resonant circuit.

2. In a frequency modulation system, a tube having electrodes including an anode, a control grid and a cathode, apparatus coupling said anode, cathode and control grid in a regenerative circuit for generating oscillations comprising a line between the grid and cathode and a line between the anode and cathode, the length of each of said lines being less than $\lambda/4$ where $\lambda$ is the wavelength of the oscillations generated, the inductive reactance of the lines being as large as possible so that the same with solely the capacity between the tube electrodes and connections forms a circuit resonant at the desired operating frequency, and means for modulating the direct current potential on the control grid of the tube to thereby modulate the capacity between the tube electrodes and the frequency of the oscillations generated.

3. In a frequency modulation system, a tube having electrodes including an anode, a control grid and a cathode, an inductance coupled between the control grid and anode, a point on said inductance being coupled to the cathode to include the said electrodes in a regenerative circuit for generating oscillations, the inductance being as large as possible so that the same with solely the tube interelectrode capacity and connections forms a circuit resonant at the desired operating frequency, a modulation transformer having a secondary winding and having a primary winding coupled with a modulation source, and a resistor in series with said secondary winding connecting the control grid of the tube to the cathode of the tube for modulating the direct potential on the control grid of the tube to vary directly the tube interelectrode capacity to correspondingly modulate the frequency of the oscillations generated through the direct effect of the varying tube interelectrode capacity on said resonant circuit.

4. In a frequency modulation system, a tube having electrodes including an anode, a control grid and a cathode, a plate stub coupling the anode to the cathode, a grid stub coupling the control grid to the cathode, the arrangement being such that oscillations are generated when the tube electrodes are supplied with direct operating potentials, said stubs each including an inner and an outer conductor, the length of each stub being a fraction of $\lambda/4$, where $\lambda$ is the desired operating wavelength, said stubs as connected forming a resonant circuit comprising mostly inductance and the small capacity between the tube electrodes, and means for modulating the direct potential on the grid of the tube to thereby modulate the tube interelectrode capacity and the frequency of the oscillations generated.

5. A system as recited in claim 3 wherein said tube and stubs are enclosed in a metallic closure member.

6. A system as recited in claim 3 wherein said last named means is the secondary winding of a modulation transformer in series with the inner conductor of the grid stub.

DE WITT R. GODDARD.

REFERENCES CITED

The following references are of record in the file of this patent:

UNITED STATES PATENTS

| Number | Name | Date |
|---|---|---|
| 2,235,010 | Chaffee | Mar. 18, 1941 |
| 2,341,040 | Hathaway | Feb. 8, 1944 |
| 2,361,731 | Bach | Oct. 31, 1944 |
| 2,394,427 | Clark et al. | Feb. 5, 1946 |
| 2,408,684 | Roberts | Oct. 1, 1946 |
| 2,413,451 | Johnson | Dec. 31, 1946 |